E. F. SPAULDING.
COIN CONTROLLED VENDING MACHINE.
APPLICATION FILED NOV. 13, 1913.
1,113,705.
Patented Oct. 13, 1914.
2 SHEETS—SHEET 1.
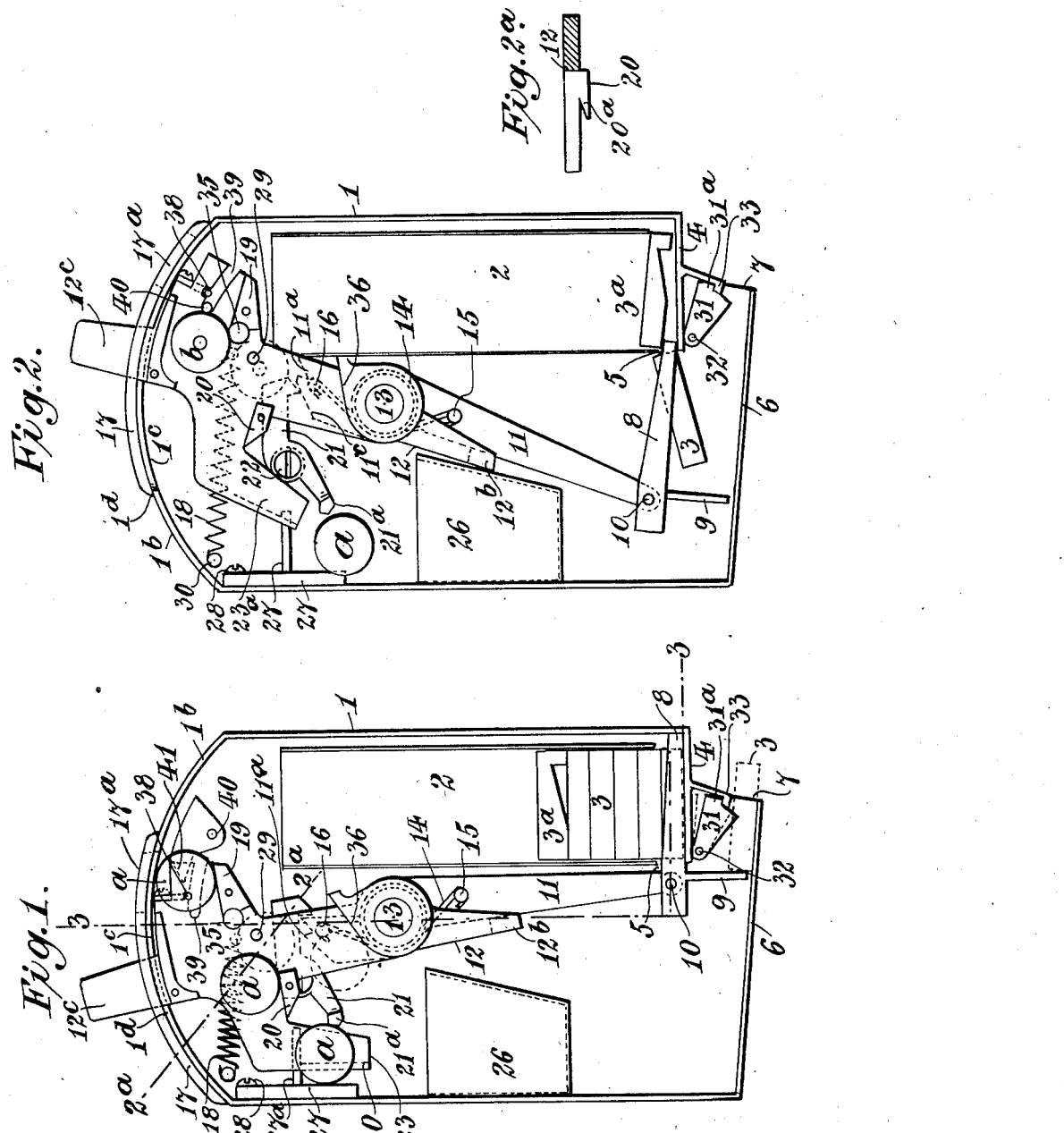
WITNESSES:
INVENTOR
E. F. Spaulding
BY
his ATTORNEY

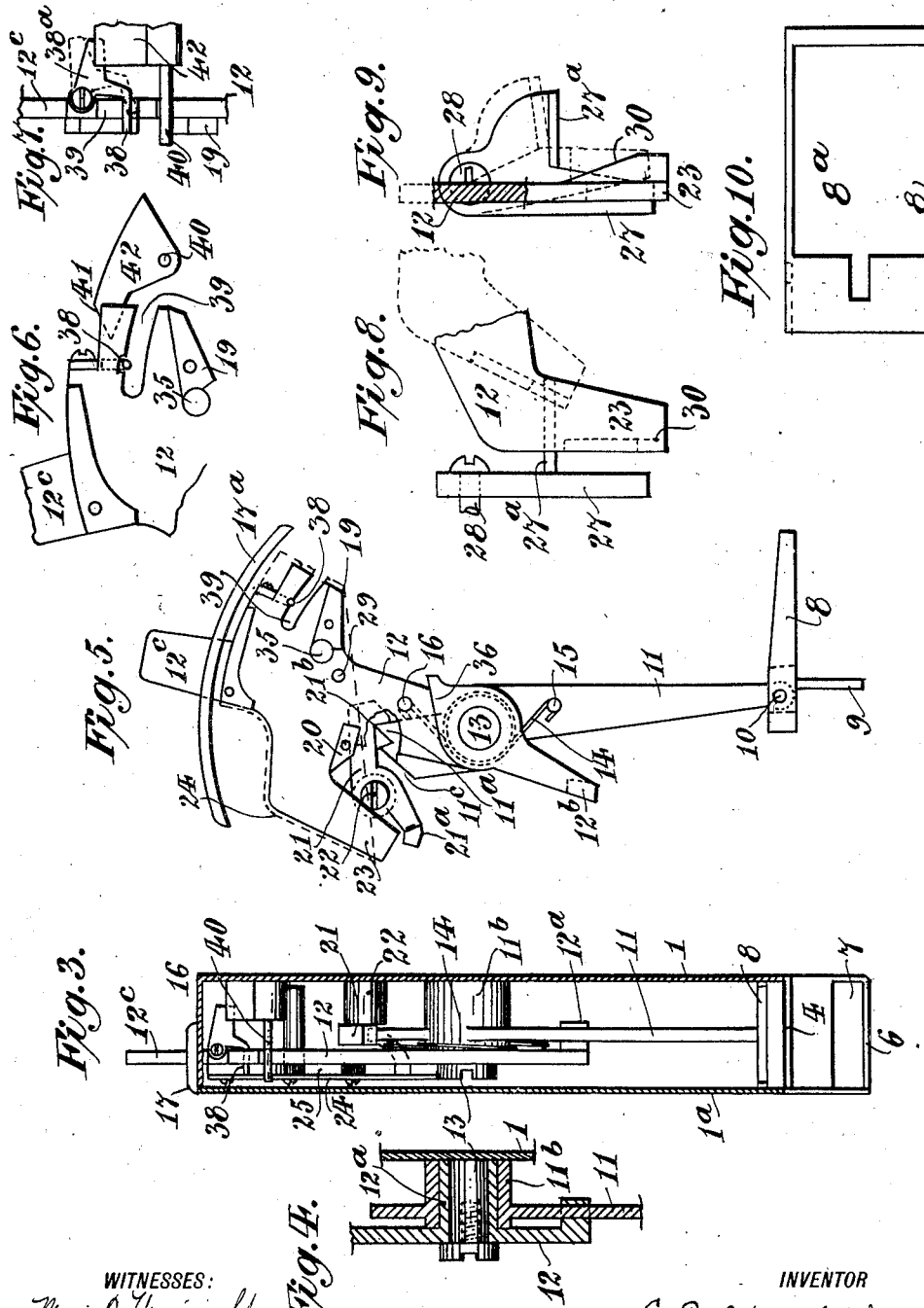
E. F. SPAULDING.
COIN CONTROLLED VENDING MACHINE.
APPLICATION FILED NOV. 13, 1913.
1,113,705.
Patented Oct. 13, 1914.
2 SHEETS—SHEET 2.

UNITED STATES PATENT OFFICE.

ELIJAH F. SPAULDING, OF NEW YORK, N. Y.

COIN-CONTROLLED VENDING-MACHINE.

1,113,705.　　　　　Specification of Letters Patent.　　Patented Oct. 13, 1914.

Application filed November 13, 1913.　Serial No. 800,710.

*To all whom it may concern:*

Be it known that I, ELIJAH F. SPAULDING, a citizen of the United States, and resident of New York city, borough of Brooklyn, in the county of Kings and State of New York, have invented certain new and useful Improvements in Coin-Controlled Vending-Machines, of which the following is a specification.

The object of my invention is to provide a vending machine with simple and efficient means, controlled by a proper coin, to permit the delivery of desired goods, such as packages of candy, chewing gum and the like, and to prevent operation of the machine in the absence of such coin, or if a spurious coin or token be inserted in the coin slot of the machine.

My invention comprises novel details of improvement and combinations of parts that will be more fully hereinafter set forth and then pointed out in the claims.

Reference is to be had to the accompanying drawings forming part hereof, wherein:

Figure 1 is a side view of my improved machine, the cover 1ᵃ and plate 24 being removed, showing the parts in position ready for operation; Fig. 2 is a similar view, illustrating the parts in operated positions; Fig. 2ᵃ is a detail section on the line 2ᵃ, 2ᵃ, in Fig. 1; Fig. 3 is a vertical section through the casing on the line 3, 3, in Fig. 1; Fig. 4 is a detail sectional view, illustrating part of the ejector lever; Fig. 5 is a detail view, illustrating the position of some of the parts when moved in the absence of a proper coin; Fig. 6 is a fragmentary detail, enlarged, illustrating a portion of the ejector lever; Fig. 7 is an edge view of Fig. 6; Fig. 8 is an enlarged detail view of a portion of the ejector lever and coin releaser; Fig. 9 is a section through Fig. 8, and Fig. 10 is a detail plan view, enlarged, of the ejector for the goods.

Similar numerals of reference indicate corresponding parts in the several views.

The numeral 1 indicates any suitable casing adapted to contain my improved coin controlled mechanism, within which casing is located a suitable guideway 2 for the packages of goods 3 adapted to be stacked therein in an ordinary manner. Beneath chute 2 the casing is shown provided with a rest or shelf 4 for the stack of goods, a space being provided at 5 below chute 2 for the lowermost article to be ejected from under the stack of goods to drop upon an inclined bottom wall 6 of the casing that is provided with the side opening 7, through which the goods are ejected. A suitable cover 1ᵃ may be detachably secured upon the open side of casing 1, in any suitable manner, whereby the goods, the coins deposited, and coin controlling and ejecting mechanism are protected.

The ejector I have shown comprises a frame 8 closed on the sides and open above and below, adapted to rest and slide upon the rest 4, as shown in Fig. 1, in position to receive the lowermost article of the stack of goods within the space 8ᵃ (Fig. 10), and whereby when said ejector is moved inwardly along rest 4, such lowermost article will be drawn into the casing for deposit upon the bottom wall 6 in position to be ejected through opening 7. Ejector 8 is provided with a downwardly extending finger or pusher 9, above wall 6, to push the article deposited upon said wall out through the opening 7. Said ejector is pivotally connected with a two-part ejector lever, as at 10. Said ejector lever is shown comprising a lower part 11 (pivotally connected with ejector 8) and an upper part 12, which parts are concentrically pivoted upon a stud or the like 13 secured upon casing 1. The lever 12 is shown provided with a hub 12ᵃ journaled upon stud 13 and the part 11 is shown provided with a hub 11ᵇ journaled upon hub 12ᵃ, and at 14 is a spring shown coiled around hub 11ᵇ and having one end attached to lever 11, at 15, and its other end attached to lever 12, at 16. Lever 12 is shown provided with a projection 12ᵇ on one side adapted to engage the lever 11 under the normal action of spring 14, whereby said spring and projection 12ᵇ serve to cause the levers 11 and 12 to assume the normal positions shown in Figs. 1 and 2, when the lever 11 is not restrained, and to permit the lever 12 to move relatively to lever 11 when the latter is restrained, for the rejection of spurious coins and tokens, as illustrated in Fig. 5.

The top wall 1ᵇ of casing 1 is shown curved on an arc described around the center of stud 13, and is cut away forming an opening at 1ᶜ, to permit the passage and play therein of the finger piece extension 12ᶜ of lever 12. Lever 12 carries a shield 17, curved to correspond to wall 1ᵇ and overlying the latter so as to slide thereon when lever 12 is rocked, and thereby to close the opening 1ᶜ. The shield 17 is provided with a coin slot 17ª which, when the levers are in the normal positions shown in Fig. 1, is in register with the opening 1ᶜ for the admission of a coin, but when the lever 12 is moved to the right, as in Figs. 2 and 5, the slot 17ª overlies the wall 1ᵇ, and prevents the insertion of a coin. A spring 18 connected with casing 1 and with lever 12 serves to normally draw the latter, and with it the lever 11 and the ejector 8, to the normal positions shown in Fig. 1, with lever 12 bearing against a stop at 1ᵈ.

Upon lever 12, beneath slot 17ª, is a coin receiving ledge 19, the upper surface of which is in such position as to incline toward the left in Fig. 1 when lever 12 is in the normal position shown in said figure, whereby the coin a that is passed through slot 17ª and drops upon ledge 19 will tend to roll from said ledge to the controlling devices for releasing the lever 11, unless a spurious coin or token be inserted through the coin slot. At a distance to one side of and below the ledge 19 is a second ledge 20 upon lever 12, onto which ledge the coin or token will fall from ledge 19, unless otherwise prevented, as hereinafter explained. Beneath ledge 20 is a coin projection 21ª extending from a latch 21 that is weighted so as to normally engage the upper end of lever 11 to prevent operation of the latter except when released by a proper coin. Latch 21 is shown pivotally supported upon casing 1 by the pivot 22, and provided with a tooth 21ᵇ to coact with either of two teeth 11ª on lever 11. When said teeth are in the position shown in Fig. 1 lever 11 is retained in normal position, but after operation of lever 11 one set of said teeth will retain lever 11 in an intermediate position if a person should attempt to obtain an extra article 3 by swinging lever 12 back and forth. Lever 12 carries a depending coin guiding finger 23, normally adjacent to projection 21ª in such position as to cause the proper coin that passes from ledge 20 to engage said projection. Upon lever 12 is secured a plate 24 (Fig. 3), that lies against ledges 19 and 20 in such position as to provide a channel or space 25 between plate 24 and the upper part of lever 12 and finger 23 for guiding a coin, on edge, in its passage from slot 17ª to ledge 19, thence to ledge 20, and thence along the finger 23 to projection 21ª. Beneath finger 23 is a suitable receptacle 26 for the coins.

At 27 is a coin releaser, shown pivotally supported upon casing 1 at 28, and hanging by gravity in opposition to the projection 21ª, the relation of the parts 27 and 21ª being such that a coin of proper diameter will rest temporarily therebetween on edge, the weight of such coin, however, after dropping from ledge 20 into engagement with projection 21ª, serving to tilt latch 21 to raise its tooth out of engagement with the teeth 11ª of lever 11, the upward swing of latch 21 at such time being limited by a stop 29 upon lever 12, whereby the coin is retained between parts 21ª and 27. At such time levers 12 and 11 are released, and may be moved together to cause ejector 8 to operate, as in Fig. 2. As lever 12 is thereupon moved, the coin is to be released by moving the releaser 27 from in front of the edge of the coin. For this purpose releaser 27 is provided with a laterally disposed projection 27ª (Figs. 8 and 9) adapted to be engaged by an inclined projection 30 carried by finger 23 in such position that, after lever 12 has been tilted a suitable distance, the projection 30 riding upwardly against projection 27ª will cause the latter to be moved away from the edge of the coin (see dotted lines in Fig. 9), thereby releasing the coin. The coin thus releases the latch 21 and falls into the coin receptacle 26. Latch 21 may then rest upon the upper edge 11ᶜ of lever 11 (Fig. 2) in position to engage and retain lever 11 when the latter next returns to normal position.

From the foregoing it will be understood that when the parts are in the normal positions and latch 21 is in engagement with lever 11, the lever 12 may be tilted regardless of the insertion of a coin; lever 11, however, cannot be tilted or operated until a coin has been inserted in the coin slot and has fallen into place between the parts 21ª and 27, and by its weight has caused latch 21 to be lifted from lever 11. At such time when lever 12 is tilted, the tension of spring 14 (causing projection 12ª to bear against lever 11) will enable lever 11 to be moved with lever 12 to cause ejector 8 to pull out the lowermost article 3 from the stack (Fig. 2), and thereupon the coin releaser 27 will be moved to release the coin. As the lever 12 may be released to be drawn back quickly by spring 18, the lever 11 with the ejector 8 may thus be quickly thrust under the stack of articles, since the free end of the ejector 8, when the levers 11, 12 have been moved, (as in Fig. 2) will rest under the adjacent edge portion of the lowermost article 3, as indicated in Fig. 2 with respect to the weight 3ª. Such quick motion of lever 11 and finger 9 would tend to forcibly eject article 3 from wall 6 through opening 7. To prevent the articles from being forcibly ejected through opening 7 I provide means to retard their exit when pushed by finger 9. For this purpose I have shown a movable member 31 beneath shelf 4 adapted to obstruct the passage of the articles 3. Said member may be in the form of a weight pivoted to casing 1 at 32, and normally held in position to permit an article 3 to slide beneath it, yet to be retarded in its exit by resting thereon. For this purpose I have shown member 31 provided with a projection 31ª resting upon a stop 33, whereby member 31 is normally in the path of the articles being ejected and may be moved back by said articles as they pass under the same, as projected by finger 9, yet will drag on the articles. The article 3 may then rest in position to be withdrawn by the purchaser, as indicated in dotted lines in Fig. 1.

As so far described the machine is adapted to operate in conjunction with a proper coin. In order to prevent the machine from being operated upon the insertion of spurious coins or tokens, that are not of the proper thickness, diameter or weight, or have other characteristics differing from a proper coin, I provide the following arrangements: The normal space between the opposed surfaces of projection 21ª and releaser 27 is such as to support the proper coin therebetween when the latter has caused latch 21 to be tilted against stop 29 and before releaser 27 has been moved to release the coin, but if a token of less diameter than such coin be inserted it will slide between the parts 21ª and 27 into the receptacle 26 without operating the latch to release lever 11. Again, the space between plate 24 and finger 30 is of such width that a coin of proper thickness will properly rest between projection 21ª and releaser 27, but a coin or token of lighter weight than a proper coin will be unable to operate the latch 21 to release lever 11. In case the token inserted should be of a character subject to magnetic attraction, I provide a permanent magnet 35 on lever 12, at a point adjacent the coin delivery edge of ledge 19 and at such a distance from the opposing edge of ledge 20 as that the token may fall (as indicated in dotted lines in Fig. 1) into the space between parts 35 and 20 and down upon the inclined edge 36 on lever 12, that is located below magnet 35 in position to direct the token into receptacle 26 as the token falls between the lever 12 and cover 1ª. Thus, when such token is inserted in slot 17ª and rides along ledge 19 it will be attracted by magnet 35 and caused to descend between said magnet and ledge 20 to prevent it from jumping or passing from ledge 19 to ledge 20, thereby to be deposited without engaging latch 21. In case a token having a hole therein, such as a washer $b$ (Fig. 2) is inserted through slot 17ª I provide means to prevent such token from reaching the projection 21ª as follows: Upon lever 12, below slot 17ª, is pivoted a finger 38, normally projecting through a slot 39 in said lever in position to engage coins or tokens passing into the machine through slot 17ª, and adapted to pass through the hole in a washer-like token $b$ to retain the latter temporarily upon ledge 19. At 40 is a pin carried by casing 1, adapted to receive slot 39 as lever 12 is tilted, and normally lying in the path of the token resting upon ledge 19.

Finger 38 is provided with a projection 38ª extending oppositely thereto, (Fig. 7), adapted to engage an inclined edge 41 formed on a suitable block 42 secured on casing 1 in position to be engaged by projection 38ª when lever 12 is rocked from its normal position, whereby to tilt finger 38 and withdraw it from the hole in the washer-like token. When such token is inserted and is caught by finger 38 passing through a hole in the token, such token will be retained upon ledge 19 and will be carried with lever 12 toward pin 40, while the projection 38ª is riding upon edge 41 to cause withdrawal of finger 38 from the token, and the continued movement of lever 12 will cause pin 40 to gradually push the token along ledge 19 to drop between ledges 19 and 20 upon ledge 36, and thence into receptacle 26, since, when the token is caught by finger 38, it is prevented from rolling suddenly from ledge 19 to ledge 20, but is carried past the vertical center passing through stud 13 (to the righthand side thereof as illustrated in Fig. 2), and will drop by gravity between ledges 19 and 20 when pushed off ledge 19 by pin 40.

In order to prevent the continued operation of a coin or token against the latch 21 when such coin or token is attached to a string or the like, I may provide the ledge 20 with an inclined inner edge 20ª (Fig. 2ª) spaced from the lever 12, whereby if such coin or token having a string attached be inserted through the coin slot and passes the ledge 20, its attached string will engage in the recess formed between the inclined edge 20ª and the lever 12 to prevent the coin from being withdrawn and dropped again against the latch, since the string will be engaged in such recess.

Having described my invention what I claim is:—

1. In a vending machine the combination of a casing, a two-part lever pivoted therein, means yieldingly connecting said levers together to cause said levers to move conjointly one by and with the other and to permit one lever to move independently of the other, one of said levers having means to eject articles from the casing, means separate from the ejecting means to lock one of said levers from movement and controlled by a coin to release the last named lever for movement with the other lever, and means to admit coins into the casing.

2. In a vending machine the combination of a casing, a two-part lever pivoted therein, means yieldingly connecting said levers together to cause said levers to move conjointly one by and with the other and to permit one lever to move independently of the other, one of said levers having means to eject articles from the casing, means separate from the ejecting means to lock one of said levers from movement and controlled by a coin to release the last named lever for movement with the other lever, said casing having an opening receiving one of said levers, said lever being provided with a shield to close said opening, said shield having a coin slot.

3. In a vending machine the combination of a casing, a two-part lever pivoted therein, means to cause said levers to move conjointly and to permit one lever to move independently of the other, one of said levers having means to eject articles from the casing, means to lock one of said levers from movement and controlled by a coin to release the last named lever for movement with the other lever, said casing having a curved wall provided with an opening to receive one of said levers, said lever being provided with a shield curved substantially corresponding to said wall and located adjacent thereto to close said opening at all positions of said lever, said shield having a coin slot in register with said opening when the lever is in its normal position, and adapted to register with a portion of said wall to prevent the entrance of a coin when said lever is moved from normal position.

4. In a vending machine the combination of a casing having an outlet, a two-part lever pivoted therein on the same axis, a spring connecting said levers together for movement together, one of said levers having means normally engaging the other, one of said levers having means to eject articles from said outlet, means to retain one of said levers from movement in the absence of a coin and adapted to be actuated by the coin to release said lever to permit conjoint operation of said levers for ejecting an article from the casing.

5. In a vending machine the combination of a casing having an outlet, a two-part lever pivoted therein on the same axis, a spring connecting said levers together for movement together, one of said levers having means normally engaging the other, one of said levers having means to eject articles from said outlet, a latch to engage said lever and adapted to be operated by the coin to release said lever therefrom.

6. In a vending machine the combination of a casing having an outlet and a coin slot, a two-part lever carried by said casing and having said parts yieldingly connected together, an article ejecting device to be operated by said lever, a latch to control said ejecting device, said latch having a portion to coact with a coin, a coin releaser spaced from said latch portion and adapted to engage a coin therebetween, and means to operate said releaser upon operation of said lever.

7. In a vending machine the combination of a casing having an outlet and a coin slot, a two-part lever carried by said casing and having said parts yieldingly connected together, an article ejecting device to be operated by said lever, a latch to control said ejecting device, said latch having a portion to coact with a coin, a coin releaser spaced from said latch portion and adapted to engage a coin therebetween, said releaser having a projection, and said lever having means to engage said projection to remove said relaser from a coin.

8. In a vending machine the combination of a casing having an outlet and a coin slot, a two-part lever carried by said casing and having said parts yieldingly connected together, an article ejecting device to be operated by said lever, a latch to retain said ejecting device from operation, said latch having a portion to coact with a coin, a coin releaser spaced from said latch portion and adapted to engage a coin therebetween, said releaser having a projection and said lever having an inclined projection to engage the first named projection to move said releaser from the coin.

9. In a vending machine the combination of a casing having an outlet and a coin slot, a lever carried by said casing, an article ejecting device to be operated by said lever, a latch to retain said ejecting device from operation and adapted to be operated by a coin, means to release the coin from said latch, said lever having ledges spaced apart to permit a coin to pass from one to the other across such space to actuate said latch, and means for guiding the coin along said ledges to said latch.

10. In a vending machine the combination of a casing having an outlet and a coin slot, a lever carried by said casing, an article ejecting device to be operated by said lever, a latch to retain said ejecting device from operation and adapted to be operated by a coin, means to release the coin from said latch, said lever having ledges spaced apart to permit a coin to pass from one to the other across such space to actuate said latch, said lever having a finger adjacent to said latch to coact with a coin, and a plate upon the lever providing a space therebetween for guiding the coin to said finger.

Signed at New York city, in the county of New York, and State of New York, this 10th day of November, A. D. 1913.

ELIJAH F. SPAULDING.

Witnesses:
T. F. BOURNE,
MARIE F. WAINRIGHT.